(12) United States Patent
Gillberg et al.

(10) Patent No.: US 9,337,728 B2
(45) Date of Patent: May 10, 2016

(54) POWER SUPPLY PROTECTION SYSTEM

(71) Applicant: Fairchild Semiconductor Corporation, San Jose, CA (US)

(72) Inventors: James E. Gillberg, Flemington, NJ (US); Juergen Pianka, Bloomfield Hills, MI (US)

(73) Assignee: Fairchild Semiconductor Corporation, San Jose, CA (US)

( * ) Notice: Subject to any disclaimer, the term of this patent is extended or adjusted under 35 U.S.C. 154(b) by 213 days.

(21) Appl. No.: 14/176,652

(22) Filed: Feb. 10, 2014

(65) Prior Publication Data

US 2014/0232454 A1   Aug. 21, 2014

Related U.S. Application Data

(60) Provisional application No. 61/765,162, filed on Feb. 15, 2013.

(51) Int. Cl.
 *H02H 7/00* (2006.01)
 *H02M 3/156* (2006.01)
 *H02M 3/158* (2006.01)
 *H02M 1/00* (2006.01)
(52) U.S. Cl.
 CPC ............ *H02M 3/156* (2013.01); *H02M 3/1588* (2013.01); *H02M 2001/0022* (2013.01); *H02M 2001/0096* (2013.01); *Y02B 70/1466* (2013.01)

(58) Field of Classification Search
 CPC .............. H02M 3/156; H02M 3/1588; H02M 2001/0022; H02M 2001/0096
 See application file for complete search history.

(56) References Cited

U.S. PATENT DOCUMENTS

| | | | | |
|---|---|---|---|---|
| 4,156,273 | A * | 5/1979 | Sato | ........................... 363/21.16 |
| 6,225,838 | B1 * | 5/2001 | Lee | ............................... 327/108 |
| 2010/0289562 | A1 * | 11/2010 | Kohama | ............ H03K 17/0828 327/541 |

OTHER PUBLICATIONS

Fairchild Semiconductor, Understanding Power MOSFETs, Application Note 7500 Rev. A1, 2002 Fairchild Semiconductor Corporation, 5 pages.

* cited by examiner

*Primary Examiner* — Thienvu Tran
*Assistant Examiner* — Tien Mai
(74) *Attorney, Agent, or Firm* — Grossman Tucker Perreault & Pfleger PLLC

(57) ABSTRACT

Devices and methods provide a protection device for maintaining a steady output on a gate driver terminal despite fluctuations in a power supply, the protection device including low voltage detection circuitry configured to monitor the power supply and detect fluctuations in the power supply; and gate isolation circuitry configured to isolate the gate driver terminal from the power supply if the low voltage detection circuitry detects a fluctuation in the power supply, wherein a voltage of the gate driver terminal is maintained within a preselected range when the gate is isolated.

20 Claims, 5 Drawing Sheets

POWER SUPPLY PROTECTION SYSTEM

FIELD

The present disclosure relates to a power supply protection system, and, more particularly, to gate protection circuitry for high voltage applications.

BACKGROUND

In automotive electronic systems, an ignition coil typically induces hundreds of volts to drive a starter motor. The ignition coil is typically controlled by a high voltage switch (e.g., IGBT, MOSFET, etc.) to couple the ignition coil to the battery voltage. If there is a momentary drop in battery voltage, the momentary drop may cause the gate of the high voltage switch to discharge and turn off, which in turn may cause a floating high voltage condition at the ignition coil. The floating high voltage condition usually results in a spark from a primary of the ignition coil to a secondary of the ignition coil, which may be dangerous and/or damaging to nearby electronic components. A conventional approach to resolve this sparking issue includes the use of a large capacitor to essentially act as a battery and keep the high voltage switch on and conducting during momentary drops in battery voltage. This approach, however, requires the use of a relatively large capacitor, which requires additional cost and physical space to implement.

BRIEF DESCRIPTION OF DRAWINGS

Features and advantages of the claimed subject matter will be apparent from the following detailed description of some example embodiments consistent therewith, which description should be considered with reference to the accompanying drawings, wherein:

Although the following Detailed Description will proceed with reference being made to illustrative example embodiments, many alternatives, modifications, and variations thereof will be apparent to those skilled in the art.

DETAILED DESCRIPTION

Figure 1:
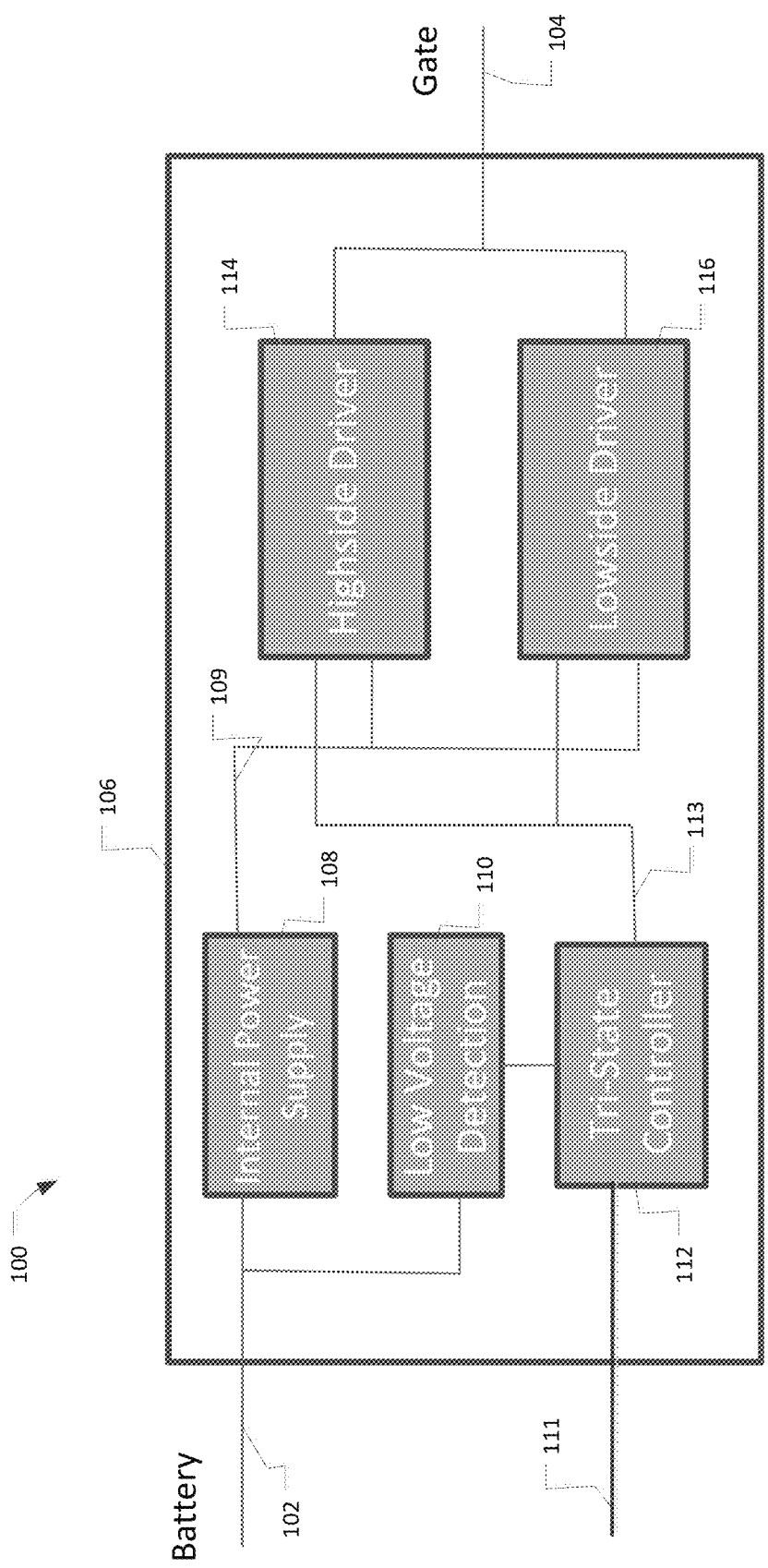
FIG. 1 illustrates a block diagram of a power supply protection system consistent with various example embodiments of the present disclosure.

FIG. 1 illustrates a block diagram of a power supply protection system 100 consistent with various example embodiments of the present disclosure. The power supply protection system 100 depicted in FIG. 1 may be included with, or form part of, a general-purpose or custom integrated circuit (IC) such as a semiconductor integrated circuit chip, system on chip (SoC), etc. The following description will reference an automobile starter coil as an example, however, it should be understood at the outset that this is only a non-limiting example and the teachings of the present disclosure may be utilized in any system where uninterrupted switch conductance is desirable or required. In addition, the following Detailed Description will describe certain specific types of switch circuits, for example, FET, BJT, IGBT, SiC, etc., however, it is to be understood that these switch types may be interchangable for certain applications (as understood by one skilled in the art), and thus the present disclosure is not limited to any specific switch type that may be shown in a drawing and/or described herein.

The power supply protection system 100 includes a gate controller 106 that is generally configured to provide an uninterrupted gate control signal 104 when the battery voltage 102 drops below a normal operating value. The gate control signal 104 may be utilized to control a switch (not shown in the Figure) that is coupled to an external high voltage circuit (not shown in this Figure, e.g., a starter coil). The gate controller 106 generally includes internal power supply circuitry 108 that is configured to generate an internal voltage 109 (e.g., Vdd voltage) to supply power to some or all of the functional components of the gate controller 106. The internal power supply circuitry 108 is generally configured to generate the internal voltage 109 based on the battery voltage 102. The gate controller 106 may also include low voltage detection circuitry 110 that is configured to detect a low voltage condition of the internal voltage 109. Highside driver circuitry 114 and lowside driver circuitry 116 are generally configured to provide the gate control signal under different operating conditions, as will be described in detail below. Tri-state controller circuitry 112 may also be provided that is configured to generate a control signal 113 to control the operation of the highside driver circuitry 114 and/or lowside driver circuitry 116 to provide the gate control signal 104 under various operating conditions. The tri-state controller circuitry 112 is generally configured to receive an enable signal 111 indicative of a desired state of the gate control signal 104 (i.e., the control signal 111 indicates whether the gate control signal 104 should be high or low).

In one example, if the enable signal 111 is low, the tri-state controller circuitry 112 is configured to generate the control signal 113 to control the highside driver circuitry 114 and/or lowside driver circuitry 116 so that the gate control signal 104 is also low. In another example, if the enable signal 111 is high, the tri-state controller circuitry 112 is configured to generate the control signal 113 to control the highside driver circuitry 114 and/or lowside driver circuitry 116 so that the gate control signal 104 is also high. In yet another example, if the enable signal 111 is high but the battery voltage 102 temporarily drops below a threshold, the tri-state controller circuitry 112 is configured to generate the control signal 113 to control the highside driver circuitry 114 and/or lowside driver circuitry 116 so that the gate control signal 104 remains high. Thus, the gate controller 106 is configured to keep the gate control signal 104 in a state that allows a switch coupled thereto active so that there is no interruption of power transfer at the load. These examples assume that the gate control signal 104 is coupled to a switch that can be controlled to open with a low gate control signal and close (conduct) with a high gate control signal 104. Of course, those skilled in the art will recognize that other switch types may operate to open with a high gate control signal and close with a low gate control signal, and thus, the gate controller circuitry may be modified to generate the appropriate level for the gate control signal 104, as is well known.

Figure 2:
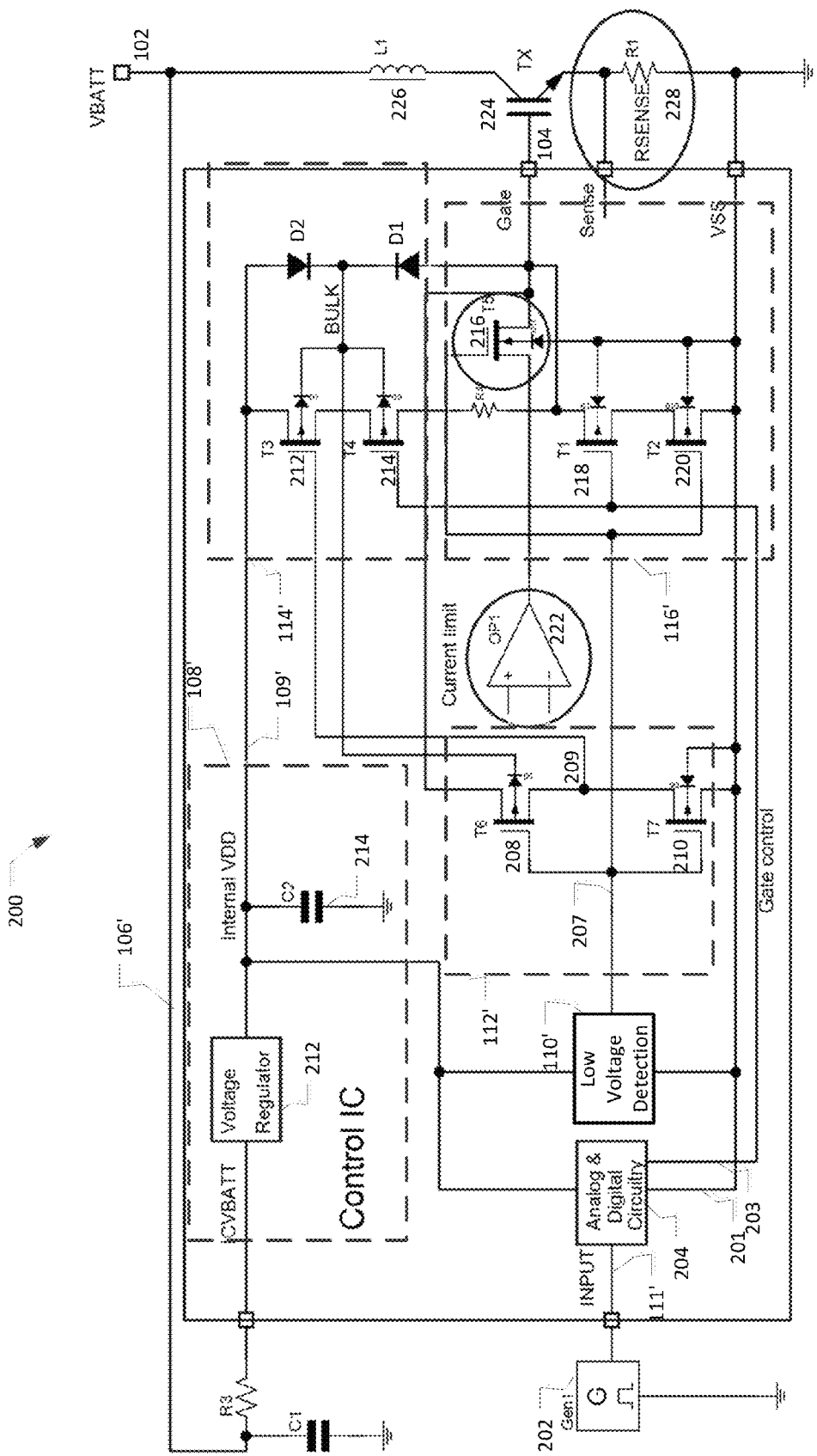
FIG. 2 illustrates a circuit diagram of a power supply protection system according to one example embodiment of the present disclosure.

FIG. 2 illustrates a circuit diagram of a power supply protection system 200 according to one example embodiment of the present disclosure. In this example embodiment, the gate control signal 104 is used to control the conduction state of switch 224. The primary side of an ignition coil (illustrated as inductor coil 226) is coupled between the collector of switch 224 and the battery voltage 102. Enable signal generation circuitry 202 is included in this example embodiment to generate the enable signal 111'. In one example, the enable signal generation circuitry 202 may include automobile electronic control circuitry. The gate controller 106' of this example embodiment is configured to generate the gate control signal 104 based on the state of the enable signal 111' and based on the state of the battery voltage 102, as will be explained in greater detail below.

The internal power supply 108' of this example embodiment includes voltage regulator circuitry 212 coupled to the battery voltage 102 and capacitor 214. The voltage regulator circuitry is configured to generate the internal voltage (e.g., Vdd) 109'. Capacitor 214 is coupled to the internal power supply rail 109' and configured to provide filtering of the power supply 109'.

This example embodiment also includes analog and digital circuitry 204 coupled to the enable signal 111' and to the internal power supply 109'. Analog and digital circuitry 204 may include, for example, time-out circuitry to prevent the enable signal 111' from being asserted beyond a desired time threshold. Analog and digital circuitry 204 may be coupled to a reference (e.g., ground) 201 and may be configured to generate a master drive signal 203 to control the operation of the tri-state control circuitry 112', the highside driver circuitry 114' and the lowside driver circuitry 116', as will be described in greater detail below. This example embodiment also includes low voltage detection circuitry 110' coupled to the internal power supply 109' and configured to generate a first drive signal 207 indicative of the state of the internal power supply 109'. In this example, if the battery voltage 102 is at a nominal operating level (e.g., 12 Volts DC) and the internal voltage 109' is at a nominal operating level, the first drive signal 207 will be High. Low voltage detection circuitry 110' is configured to compare the internal power supply 109' to a reference voltage (not shown), and the reference voltage is generally selected to be less than the voltage of the internal power supply 109'. If the internal power supply 109' drops below the reference voltage, it is an indication that the battery voltage 102 has dropped below a normal operating voltage (e.g. 12 Volts), and the first drive signal 207 changes states (e.g., from High to Low). Example embodiments are not limited thereto, and the low voltage detection circuitry 110' may or may not be included and/or may be configured to control the first drive signal 207 to be Low if the battery voltage 102 is at a nominal operating level and the internal voltage 109' is at a nominal operating level. The tri-state control circuitry 112' of this example embodiment includes inverter circuitry that includes P-Type switch 208 and N-Type switch 210 controlled by the first drive signal 207. The inverter circuitry (208 and 210) is configured to generate a second drive signal 209. The second drive signal 209 is an inverted version of signal 207. The gates of switches 208 and 210 are coupled to the first drive signal 207, the drains of switches 208 and 210 are coupled together to generate the second drive signal 209. The source of switch 208 is coupled to the gate control signal 104 and the source of switch 210 is coupled to the reference 201.

The highside driver circuitry 114' of this example embodiment includes P-Type switch 212, P-Type switch 214, diode D1 and diode D2. The source of switch 212 is coupled to the internal power supply 109', the drain of switch 212 is coupled to the source of switch 214 and the gate of switch 212 is coupled to the second drive signal 209. The source of switch 214 is coupled to the drain of switch 212, the drain of switch 214 is coupled to the lowside driver circuitry 116' (described below) and the gate of switch 214 is coupled to the master drive signal 203. The bulk regions of switches 212 and 214 are coupled together at the BULK node, as shown. Diode D2 is coupled to the internal power supply 109' in forward bias to the BULK node, and diode D1 is coupled to the gate control signal 104 in forward bias to the BULK node. The lowside driver circuitry 116' of this example embodiment includes N-Type switch 218 and N-Type switch 220. The drain of switch 218 is coupled to the drain of switch 214, via resistor R4, and to the gate control signal 104. The source of switch 218 is coupled to the drain of switch 220 and the gate of switch 218 is coupled to the master drive signal 203. The drain of switch 220 is coupled to the source of switch 218, the source of switch 220 is coupled to reference 201 (e.g., ground) and the gate of switch 220 is coupled to first drive signal 207. The bulk regions of switches 218 and 220 are coupled together and to the reference 201.

To limit the current through the primary side of the inductor coil 226, this example embodiment may also include current limiting control circuitry that may include amplifier 222 and N-Type switch 216 coupled to the gate control signal 104. The amplifier 222 may be configured to compare an internal reference voltage against a sensed voltage proportional to the current in the switch 224 and/or ignition coil 226. The sensed voltage may be generated, for example, using sense resistor circuitry 228 (Rsense). The output of the amplifier 222 may be used to control the current in the switch 224 based on the sensed signal via the sense resistor circuitry 228 (Rsense). The source of switch 216 is coupled to the output of amplifier 222, the drain of switch 216 is coupled to the gate control signal 104 and the gate of switch 216 is coupled to the first drive signal 207. The bulk region of switch 216 may be coupled to the bulk regions of switches 218 and 220. The operation of the gate controller 106' is described in detail below.

Enable Signal Asserted—Normal Battery Voltage

In operation, when the enable signal generation circuitry 202 asserts the enable signal 111', this indicates that gate control signal 104 should be in a state to control the switch 224 to conduct, i.e., so that current can flow from the battery 102 through the primary side of the inductor coil 226. For purposes of this example, the enable signal 111' is asserted High, and the battery voltage 102 is a nominal operating level (e.g., 12 Volts DC), which is considered normal. With the battery voltage 102 being normal, the voltage regulator circuitry 212 generates the internal power supply (Vdd) 109'. If the internal power supply 109' is above a threshold, the low voltage detection circuitry 110' generates a High first drive signal 207. The tri-state controller circuitry 112' generates a Low second drive signal 209 due to switch 208 being off and switch 210 being on. As the master gate control signal 203 is Low (generated by the analog and digital circuitry 204), switch 214 is on and switch 218 is off. Switches 216 and 220 are turned on due to the first drive signal 207 being High, while switch 212 is turned on due to the second drive signal 209 being Low. Thus, the gate control signal 104 is High (from Vdd though switch 212, 214 and 216) and the switch 224 is turned on to conduct.

Enable Signal Asserted—Battery Voltage Drops to Approximately Zero

With the enable signal 111' asserted, there may be instances of momentary drops (e.g., on the order of 10 microseconds) of the battery voltage 102. Without the gate controller 106' of the present disclosure, such momentary drops in the battery voltage 102 may cause the gate control signal 104 to discharge, thus opening switch 224 and allowing a high voltage condition to exist at the collector of switch 224. Such a high voltage condition may cause a dangerous or damaging spark from the primary of the inductor coil 226 to the secondary of the starter coil (not shown). Accordingly, the gate controller 106' of this example embodiment is configured to maintain the state of the gate controller signal 104 despite such momentary drops in the battery voltage 102. In operation, if the battery voltage 102 drops below the nominal operating level (approximately 12 Volts DC), for example dropping to approximately 0 Volts, the internal power supply 109' may drop to a level such that the low voltage detection 110' may generate a Low first drive signal 207. This turns on switch 208 and turns off switch 210 so that the second drive signal 209 is High. Switches 216 and 220 are turned off due to the first drive signal 207 being Low. Since switch 208 is on due to the first drive signal 207 being Low and the source of switch 208 is held at the voltage of the gate controller signal (High), the drain of switch 208 and the gate of switch 212 is therefore held at approximately the voltage of the gate controller signal (High), turning switch 212 off. Since switch 212 is off, diode D2 blocks the voltage of the gate controller signal 104 from discharging to the Vdd rail 109' (which during this low voltage condition may be significantly lower than the gate control signal 104), thus the switch 224 is held in a conducting state even though the battery voltage 102 has dropped to zero. Therefore, the voltage at the gate controller signal 104 is maintained within a preselected range when the gate is isolated.

The state of switches 214 and 218 do not matter, since switches 212 and 220 are off, thus isolating the gate control signal 104 from either reference 201 (e.g. ground) or the power supply rail 109'. When the battery voltage rises to a normal operating voltage, the controller 106' operates as described above with regard to "Enable Signal Asserted—Normal Battery Voltage."

Enable Signal De-Asserted

When the enable signal generation circuitry 202 de-asserts the enable signal 111' when the battery voltage 102 is normal, the master control signal 203 is High, the first drive signal 207 is High and the second drive signal 209 is Low. Thus, switch 212 is off due to the second drive signal 209 being High, switch 214 is off due to the master control signal 203 being High, switches 216 and 220 are on due to the first drive signal 207 being High and switch 218 is on due to the master control signal 203 being high. Diode D1 blocks the voltage rail Vdd 109' from the gate control signal 104, and the gate control signal 104 discharges to reference 201 via switches 218 and 220. Thus, the gate control signal 104 is Low, and switch 224 does not conduct.

Figure 3:
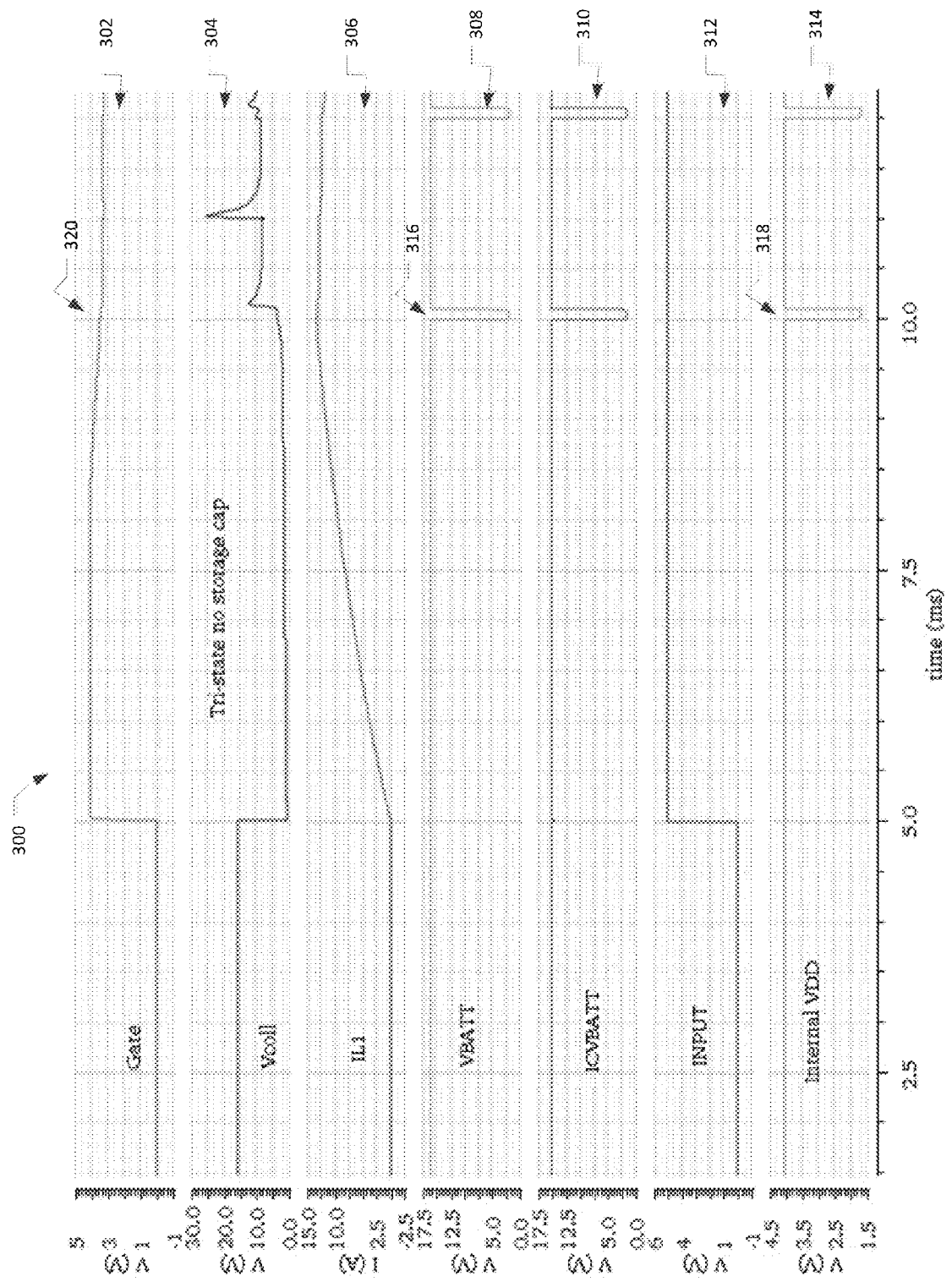
FIG. 3 illustrates simulation waveforms of the circuit diagram of FIG. 2.

FIG. 3 illustrates simulation waveforms 300 of the circuit diagram of FIG. 2. Waveform 302 depicts the gate control signal 104, waveform 304 depicts the collector voltage of switch 224, waveform 306 depicts the current through the primary of the inductor coil 226, waveform 308 depicts the battery voltage 102, waveform 310 depicts the input voltage to the voltage regulator circuitry 212, waveform 312 depicts the enable signal 111', and waveform 314 depicts the voltage of the internal voltage rail 109'. When the enable signal 312 is asserted (low to high), the gate control signal 302 changes states (low to high) and the collector voltage 304 drops. The current through the primary of the starter coil 306 ramps up and reaches a normal operating value. During a momentary drop (316) of battery voltage 308, the internal voltage rail 314 also drops (318), but as a result of the operations described above in reference to the gate controller 106', there is little drop in the gate control signal in the same time period (320). Also, during the momentary drop 316 of the battery voltage 308, there is little drop in the current 306, and the collector voltage 304 stays within normal operational parameters.

Figure 4:
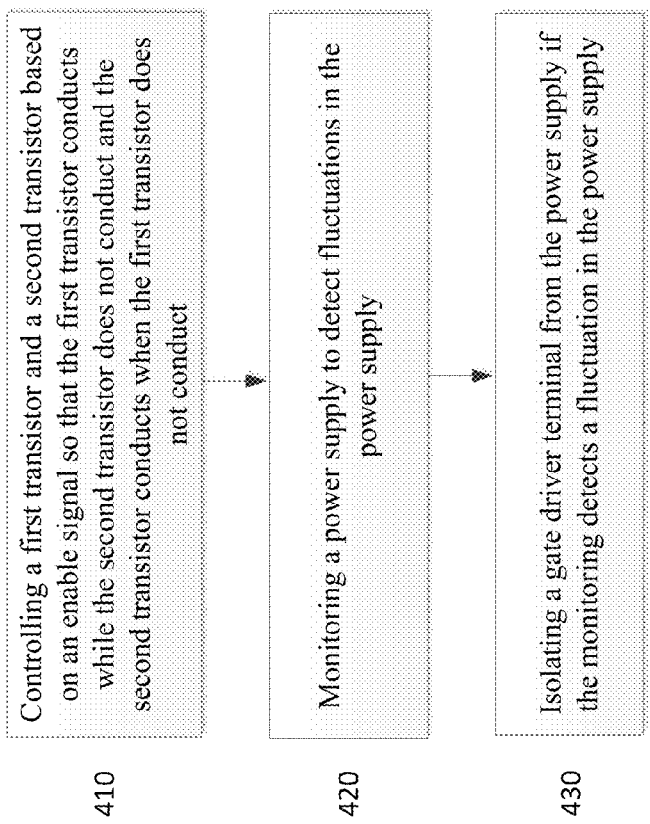
FIG. 4 illustrates a flowchart of operations according to some example embodiments of the present disclosure.

FIG. 4 illustrates a flowchart of operations according to some example embodiments of the present disclosure. At operation 410, a first transistor and a second transistor are controlled based on an enable signal so that the first transistor conducts while the second transistor does not conduct and the second transistor conducts when the first transistor does not conduct. At operation 420, a power supply is monitored to detect fluctuations in the power supply. At operation 430, a gate driver terminal is isolated from the power supply if the monitoring detects a fluctuation in the power supply.

Figure 5:
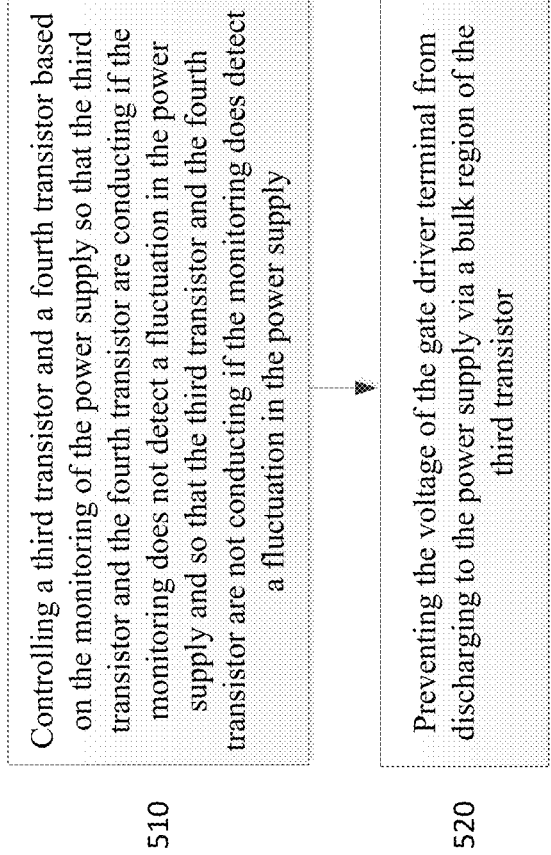
FIG. 5 illustrates a flowchart of operations to isolate the gate driver terminal according to some example embodiments of the present disclosure.

FIG. 5 illustrates a flowchart of operations to isolate the gate driver terminal according to some example embodiments of the present disclosure. At operation 510, a third transistor and a fourth transistor are controlled based on the monitoring of the power supply so that the third transistor and the fourth transistor are conducting if the monitoring does not detect a fluctuation in the power supply and so that the third transistor and the fourth transistor are not conducting if the monitoring does detect a fluctuation in the power supply. At operation 520, the voltage of the gate driver terminal is prevented from discharging to the power supply via a bulk region of the third transistor.

The terms "circuitry" or "circuit", as used in any example embodiment herein, may comprise, for example, singly or in any combination, hardwired circuitry, programmable circuitry, state machine circuitry, and/or circuitry available in a larger system, for example, discrete elements that may be included as part of an integrated circuit. In addition, any of the switch devices described herein may include any type of known or after-developed switch circuitry such as, for example, MOS transistors, BJTs, SiC transistors, IGBTs, etc.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and some example embodiments have been described herein. The features, aspects, and example embodiments are susceptible to combination with one another as well as to variation and modification, as will be understood by those having skill in the art. The present disclosure should, therefore, be considered to encompass such combinations, variations, and modifications.

What is claimed is:

1. A protection device for maintaining a steady output on a gate driver terminal despite fluctuations in a power supply, the protection device comprising:

low voltage detection circuitry configured to monitor the power supply and detect fluctuations in the power supply; and gate isolation circuitry configured to isolate the gate driver terminal from the power supply if the low voltage detection circuitry detects a fluctuation in the power supply, wherein a voltage of the gate driver terminal is maintained within a preselected range when the gate is isolated.

2. The protection device of claim 1, further comprising:
highside driver circuitry;
lowside driver circuitry;
tri-state controller circuitry configured to control the highside driver circuitry and the lowside driver circuitry, the tri-state controller circuitry including the gate isolation circuitry.

3. The protection device of claim 2, wherein the highside driver circuitry comprises:
a first transistor coupled to the power supply;
a second transistor coupled to the first transistor;
a resistor coupled between the second transistor and the gate driver terminal.

4. The protection device of claim 3, further comprising:
a third transistor coupled between the gate driver terminal and a gate of the first transistor, a gate of the third transistor coupled to the low voltage detection circuitry, wherein
the low voltage detection circuitry is configured to control the third transistor to conduct if the low voltage detection circuitry detects the fluctuation in the power supply, and
the voltage of the gate driver terminal switches the first transistor off, isolating the gate driver terminal from the power supply.

5. The protection device of claim 3, wherein the highside driver circuitry further comprises:
a first diode having an anode coupled to the gate driver terminal and a cathode coupled to a bulk region of the first transistor and a bulk region of the second transistor; and
a second diode having an anode coupled to the power supply and a cathode coupled to the bulk region of the first transistor and the bulk region of the second transistor.

6. The protection device of claim 5, wherein if the power supply fluctuates, the second diode is configured to prevent the voltage of the gate driver terminal from discharging to the power supply.

7. The protection device of claim 3, wherein the lowside driver circuitry comprises:
a fourth transistor coupled to a low reference potential, a gate of the fourth transistor coupled to the low voltage detection circuitry;
a fifth transistor coupled between the fourth transistor and the gate driver terminal.

8. The protection device of claim 7, further comprising:
analog and digital circuitry configured to control the second transistor and the fifth transistor.

9. The protection device of claim 7, wherein the low voltage detection circuitry is configured to control the first transistor and the fourth transistor to not conduct if the low voltage detection circuitry detects fluctuations in the power supply.

10. The protection device of claim 1, further comprising:
current limiting control circuitry configured to control a current in an external switch coupled to the gate driver terminal.

11. The protection device of claim 10, wherein the current limiting control circuitry comprises:
an amplifier configured to compare a desired voltage against a sensed voltage that is proportional to a current in the external switch; and
a switch coupled between the amplifier and the gate driver terminal.

12. A system, comprising:
an inductor coil;
an external switch; and
a protection device including,
low voltage detection circuitry configured to monitor a power supply and detect fluctuations in the power supply, and
gate isolation circuitry configured to isolate a gate driver terminal from the power supply if the low voltage detection circuitry detects a fluctuation in the power supply,
wherein the gate driver terminal is coupled to a gate of the external switch and a voltage of the gate driver terminal is maintained within a preselected range when the gate is isolated.

13. The system of claim 12, wherein the protection device further comprises:
a first transistor coupled to the power supply;
a second transistor coupled to the first transistor;
a resistor coupled between the second transistor and the gate driver terminal;
a third transistor coupled to a low reference potential;
a fourth transistor coupled between the third transistor and the gate driver terminal,
wherein the low voltage detection circuitry is configured to control the first transistor and the third transistor to not conduct if the low voltage detection circuitry detects fluctuations in the power supply.

14. The system of claim 12, wherein the protection device further comprises:
current limiting control circuitry configured to control a current in the external switch, the current limiting control circuitry including,
an amplifier configured to compare a desired voltage against a sensed voltage that is proportional to a current in the external switch; and
a switch coupled between the amplifier and the gate driver terminal.

15. A method for maintaining a steady output on a gate driver terminal despite fluctuations in a power supply, the method comprising:
monitoring the power supply to detect fluctuations in the power supply; and
isolating the gate driver terminal from the power supply if the monitoring detects a fluctuation in the power supply,
wherein a voltage of the gate driver terminal is maintained within a preselected range during the isolating.

16. The method of claim 15, wherein the gate driver terminal is coupled to the power supply through a first transistor and a second transistor and the isolating further comprises:
switching off the first transistor if the monitoring detects the fluctuation in the power supply.

17. The method of claim 16, wherein a bulk region of the first transistor is coupled to the power supply, a bulk region of the second transistor and the gate driver terminal, the method further comprising:
preventing the voltage of the gate driver terminal from discharging to the power supply.

18. The method of claim 15, further comprising:
preventing the voltage of the gate driver terminal from discharging to the power supply.

19. The method of claim 15, further comprising:
controlling a current in an external switch coupled to the gate driver terminal, the controlling including comparing a desired voltage against a sensed voltage that is proportional to a current in the external switch, and controlling a switch based on the monitoring of the power supply so that the switch does not conduct if the monitoring detects a fluctuation in the power supply.

20. The method of claim 15, further comprising:
controlling a first transistor and a second transistor based on an enable signal so that the first transistor conducts while the second transistor does not conduct and the second transistor conducts when the first transistor does not conduct, wherein the isolating includes controlling a third transistor and a fourth transistor based on the monitoring of the power supply so that the third transistor and the fourth transistor are conducting if the monitoring does not detect a fluctuation in the power supply and so that the third transistor and the fourth transistor are not conducting if the monitoring does detect a fluctuation in the power supply.

* * * * *